M. SPIRIKOWICZ.
ANIMAL TRAP.
APPLICATION FILED MAR. 7, 1912.
1,032,089.
Patented July 9, 1912.
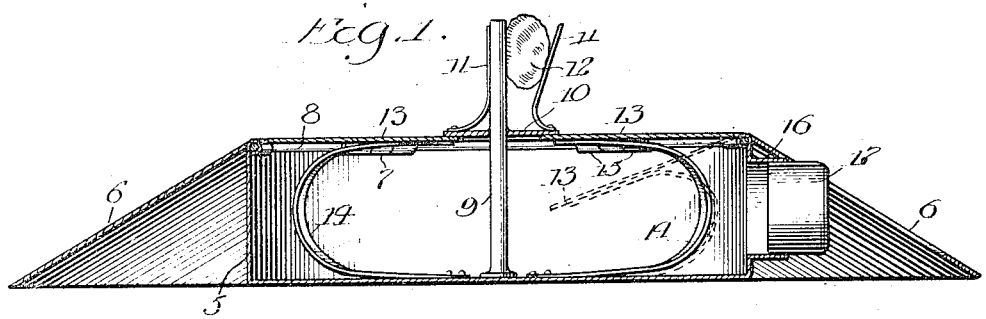
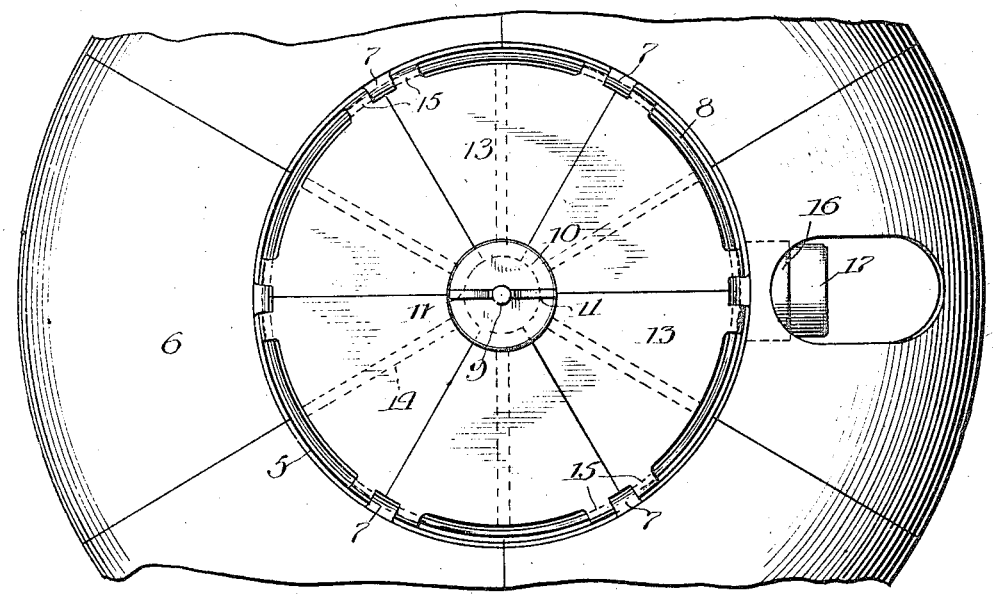
Witnesses
O. M. Wernich
E. Newstrom
Inventor
Mateusz Spirikowicz
by Chas. C. Tillman
Atty.

UNITED STATES PATENT OFFICE.

MATEUSZ SPIRIKOWICZ, OF CICERO, ILLINOIS.

ANIMAL-TRAP.

1,032,089.  Specification of Letters Patent.  Patented July 9, 1912.

Application filed March 7, 1912. Serial No. 682,203.

*To all whom it may concern:*

Be it known that I, MATEUSZ SPIRIKOWICZ, a subject of the Czar of Russia, residing at Cicero, in the county of Cook and State of Illinois, have invented certain new and useful Improvements in Animal-Traps, of which the following is a specification.

This invention relates to improvements in a trap, which while it is more particularly intended for trapping or catching mice, yet it is applicable for use in trapping larger animals such as squirrels, rabbits, and the like, and it consists in certain peculiarities of the construction, novel arrangement, and operation of the various parts thereof, as will be hereinafter more fully set forth and specifically claimed.

The principal object of the invention is to provide an animal trap which shall be simple and inexpensive in construction, strong, durable, and effective in operation, and so made, that it will be automatic or self acting in its operation, to the end, that its capacity for entrapping animals will be unlimited, except by the capacity of the cage or confining receptacle.

A further object of the invention is to provide a trap of the above named general character, which shall be noiseless in its operation, and of such construction that when the animals are encaged, there will be no possibility of their escape.

Other objects and advantages of the invention will be disclosed in the subjoined description and explanation.

In order to enable others skilled in the art to which the invention pertains, to make and use the same I will now proceed to describe it referring to the accompanying drawing in which—

Figure 1, is a central vertical sectional view of the trap embodying the invention, showing the parts by continuous lines in their normal positions and one of the spring actuated trap doors, by dotted lines in its depressed position, and Fig. 2, is a fragmental plan view of the trap.

Like numerals of reference refer to corresponding parts throughout the different views of the drawing.

The reference numeral 5, designates the cage or trapping receptacle, which may be made of any suitable size, form and material, but preferably of sheet metal and cylindrical in shape as shown, with its upper end open.

Surrounding the receptacle 5, is an inclined platform 6, which reaches from the floor or support on which the cage or receptacle 5, rests, to the upper end of the same, and may be made in sections as shown in Fig. 2, of the drawings. The upper edge of this platform rests on the upper rim of the receptacle or cage 5, and if desired, may be secured thereto by means of solder or otherwise.

The upper edge of the receptacle 5, is provided with a series of inturned and downwardly curved lips or extensions 7, which support a ring 8, of wire, which is of sufficient size to fit within the rim of the receptacle 5, yet at a little distance inwardly therefrom, in which position it will be held by means of the lips 7.

Secured to the center of the bottom of the receptacle 5, and extending upwardly some distance above the upper portion of said receptacle is a post 9, on which is fixed a disk or plate 10, which is located in about a horizontal plane with the rim of said receptacle.

Secured on the upper surface of the disk or plate 10, are a number of springs or grippers 11, which are bent near their lower portions toward the post 10, and are employed for the purpose of holding between them and the said post pieces of bait 12, such as cheese, meat, and the like, to attract the mice or animals.

Pivotally secured at their outer ends to the wire or rod ring 8, are a number of segmental trap doors 13, whose inner ends are located under the disk 10, as is clearly shown in Figs. 1, and 2, of the drawing, which disk will prevent their upward movement.

Located under each of the trap doors 13, is a bow spring 14, which has its lower end secured to the bottom of the receptacle 5, near the post 9, and its upper end in loose engagement with the lower surface of one of the trap doors. These springs are of sufficient flexibility to allow the doors 13, to be easily depressed at their inner or free portions as shown by dotted lines so as to cause the mice or animals to be slid therefrom into the receptacle 5, and said springs are of sufficient tension to force the trap doors 13, upwardly against the disk 10, and to hold the same securely thereagainst. As shown, the doors 13, are segmental in shape, and when in their normal positions, will completely close the upper portion of the receptacle 5, thereby rendering it impossible for the mice or animals to escape.

While I have shown each of the doors 13, provided at its outer edge with a curved lip or extension 15, which loosely surrounds the wire or rod ring 8, and pivotally connects said doors at one of their ends to said ring, yet I do not desire to be limited to this manner of pivoting said doors to the ring, as it may be done in any other suitable manner.

The receptacle 5, is provided in its wall with a tubular extension 16, for the removal of the mice or animals after they have been trapped and this extension may be closed by means of a stopper 17, until it is desired to open the said tubular extension for the discharge of mice or animals.

From the foregoing and by reference to the drawings, it will be readily understood and clearly seen, that a very simple, inexpensive, and efficient trap for animals of various kinds will be afforded, and that the capacity of the trap is limited only by the capacity of the cage or trapping receptacle.

Having thus fully described my invention what I claim as new and desire to secure by Letters-Patent is—

In an animal trap, the combination with a cylindrical cage or trapping receptacle, of a post extended upwardly from the bottom thereof and above the upper end of the same, a disk fixed on said post between its ends, bait gripping springs secured at one of their ends to said disk and bent upwardly toward said post, a ring supported on the upper portion of said receptacle and inwardly of its rim, a series of segmental trap doors hingedly connected at their outer ends to said ring and adapted to extend at their other ends beneath said disk, a bow spring secured at one of its ends to the bottom of said receptacle under each of said trap doors and loosely engaging said door at its other end.

MATEUSZ SPIRIKOWICZ.

Witnesses:
CHAS. C. TILLMAN,
KASMIR SPIRIKOWICZ.